(12) United States Patent
Ladouceur (10) Patent No.: US 8,137,557 B2
(45) Date of Patent: Mar. 20, 2012

(54) WASTEWATER TREATMENT METHOD

(76) Inventor: Richard Ladouceur, Hornby Island (CA)

( * ) Notice: Subject to any disclaimer, the term of this patent is extended or adjusted under 35 U.S.C. 154(b) by 346 days.

(21) Appl. No.: 12/434,274

(22) Filed: May 1, 2009

(65) Prior Publication Data

US 2009/0272689 A1    Nov. 5, 2009

(51) Int. Cl.
*C02F 3/00* (2006.01)
(52) U.S. Cl. .......... 210/615; 210/620; 210/629
(58) Field of Classification Search .......... 210/615, 210/620, 629
See application file for complete search history.

(56) References Cited

U.S. PATENT DOCUMENTS

| | | | |
|---|---|---|---|
| 5,162,083 A | 11/1992 | Forbes et al. | |
| 6,162,020 A | 12/2000 | Kondo | |
| 6,554,996 B1 | 4/2003 | Rebori | |
| 6,780,318 B2 * | 8/2004 | Fife et al. | 210/621 |
| 6,942,788 B1 | 9/2005 | Cox et al. | |
| 7,018,536 B2 | 3/2006 | Couch | |
| 7,252,766 B2 | 8/2007 | Stuth, Sr. et al. | |
| 2007/0227970 A1 | 10/2007 | Wickham | |

* cited by examiner

*Primary Examiner* — Chester Barry
(74) *Attorney, Agent, or Firm* — Davis & Bujold, P.L.L.C.

(57) ABSTRACT

A liquid aeration apparatus includes a vessel having sidewalls, a closed bottom end and, a liquid outlet being provided at or near the upper end. The sidewalls define a cross-sectional interior open area with a vertical depth. An air diffuser is positioned within the interior open area of the vessel. A liquid intake conduit is positioned with an inlet end located at or near the upper end of the vessel and an outlet located near the bottom end of the vessel.

11 Claims, 8 Drawing Sheets

WASTEWATER TREATMENT METHOD

FIELD

The invention relates to a liquid aeration apparatus and method for treating wastewater or other liquids contained within open and/or closed liquid containment means and more specifically to wastewater contained within a septic tank.

BACKGROUND

The treatment of wastewater within large populated areas is typically performed by conveying wastewater through a network of pipes to a centralized located treatment facility where, most often, a mechanically supported aerobic biological process is used to treat the wastewater to specified levels of quality prior to being released back into the environment. These large public or privately managed treatment systems have ongoing staff and monitoring requirements to ensure that the treated wastewater can meet specified discharge requirements thereby protecting environmental and public health.

In rural areas, where piped conveyance networks are to costly or not feasible, wastewater is treated by an onsite sewerage system, which is typically a septic tank and subsurface dispersal system, that is managed by a private individual or the homeowner. The sewerage system involves conveying wastewater to a septic tank where the solids contained within the wastewater are allowed to separate into what are typically three semi distinct zones. The area between the upper scum zone and the bottom sludge zone is a zone containing a certain percentage of suspended solids, colloidal material and dissolved materials it is typically referred to as the clear zone. As wastewater enters the septic tank an equal portion leaves via an outlet positioned within the middle clear zone and is typically called effluent. The effluent is then discharged for the most part by gravity to a subsurface dispersal system that allows microorganisms within the soil to further treat the wastewater so that it will not constitute a health risk or cause environmental problems.

As population densities and water use within rural areas using septic systems have greatly increased the simple gravity type septic system is becoming challenged and often cannot provide effective wastewater treatment. To improve upon the quality of the effluent prior to being discharged, most typically into the subsurface soil environment, a number of aerobically supported wastewater treatment processes have been developed and are generally classified as aerobic treatment systems or units.

Aerobic treatment systems perform the conversion of the anaerobic effluent from the septic tank or other pre-treatment process with the introduction of air and thereby improving effluent quality prior to being discharged into soil or other receiving environments.

There exist today two principle aerobic supported processes; the first and most common process used is the activated sludge or suspended growth process, where microorganisms are freely suspended as agglomerated particles in an aerobically agitated and mixed environment. The second is the attached growth process or sometimes referred to as packed bed or fixed-film process wherein microorganisms are attached to the surfaces of solid inert material or media where they develop a biofilm.

The two principle processes as described above are often part of new treatment design requirements for providing greater then septic effluent quality discharges. However the vast majority of existing wastewater treatment systems are septic tank treatment systems and many are contributing to environmental and health risks.

A number of methods have been developed to address the possibility of converting an existing septic tank and to improve effluent quality. Representatives of such prior art examples are herein described with the following U.S. patents:

U.S. Pat. No. 5,162,083 Nov. 10, 1992 Forbes, where Forbes claims an apparatus for converting a standard anaerobic septic tank system into a highly efficient aerobic wastewater treatment system.

U.S. Pat. No. 6,554,996 Apr. 29, 2003 Rebori, where Rebori claims an apparatus for converting a typical anaerobic septic tank system into an efficient aerobic treatment system for treatment of liquor containing biodegradable wastes. The system includes a collapsible reactor module that can pass through a relatively small opening in the septic tank cover. The reactor module contains media through which the liquor to be treated can be recirculated and aerated.

U.S. Pat. No. 6,942,788 B1, Sep. 13, 2005 Cox where Cox claims a reactor chamber for placement in a wastewater treatment system. The reactor includes an air distribution manifold having a series of air release sites positioned below the fixed channel growth media and adapted to release air which disperses upwardly through the fixed channel growth media.

U.S. Pat. No. 7,252,766 B2 Aug. 7, 2007 Stuth, where Stuth claims a method and apparatus for treating wastewater wherein a submerged stand alone perforated cylinder reactor pod containing aerobic bacterial growth media and a draft tube with air pressure induced pumping action creates a spray or splash pattern so as to recirculate aerated liquor through the media and to the area surrounding the cylinder pod. Free interchange of mixed and unmixed liquor is provided via the perforation in the cylindrical pod wall.

These aerobic conversions are often very difficult to be installed with respect to the majority of existing septic tanks and can cause further problems by creating an agitated mixed liquid environment within the septic tank that increases the amount of suspended solids discharged from the tank and potentially compromises the effluent acceptance rate of the subsurface dispersal system.

SUMMARY

According to one aspect there is provided a liquid aeration apparatus, which includes a vessel having sidewalls, a closed bottom end and an upper end having a liquid outlet section at or near the upper end. The sidewalls define a cross-sectional interior open area with a vertical depth. An air diffuser is positioned within the interior open area of the vessel. A liquid intake conduit is positioned with an inlet end located at or near the upper end of the vessel and an outlet located near the bottom end of the vessel.

According to another aspect there is provided a wastewater treatment method. A first step involves providing an aeration apparatus, as described above. A second step involves conveying liquid having organic and inorganic constituents into the inlet end of the liquid intake conduit. A third step involves supplying air to the air diffuser. A fourth step involves discharging aerated liquid from the liquid outlet at or near the upper end of the liquid aeration apparatus.

Several embodiments of the apparatus and the method will hereinafter be described to demonstrate how the basic teaching can be adapted to suit different applications.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 8-a to 8-c illustrates several variants related to the liquid intake conduit that is positioned external to liquid aeration apparatus and also illustrated are arrows that indicate liquid flow direction.

DETAILED DESCRIPTION

The following illustrated figures incorporate, but are not limited to, the use of a pressurized air supply and diffusion process.

Figure 1:
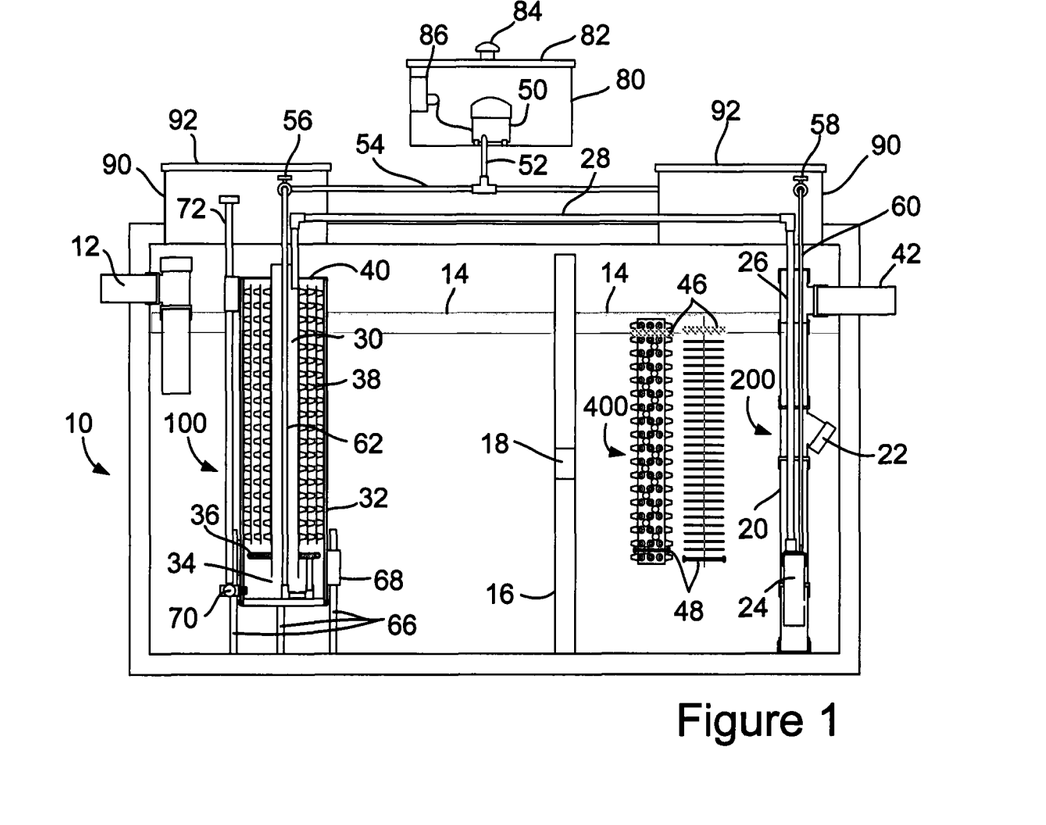
FIG. 1 is a side elevation view, in section of a partially submerged liquid aeration apparatus and treatment process layout within a two-chamber contiguous tank equipped with access risers and lids.

Referring now to one embodiment illustrated in FIG. 1, a liquid containment means 10 and said liquid containment means 10 is a septic tank, receives raw wastewater containing a high concentration of organic and inorganic constituents via inlet 12. Septic tank 10 is divided into two sections or chambers via divider wall 16 wherein is placed an outlet opening 18 that intersects said divider wall 16 at a predetermined distance from bottom of tank 10 and is in contiguous communication with wastewater contained within chamber two. Wastewater 14 of chamber two flows into liquid transfer means housing assembly 200 via inlet 22. Liquid transfer housing assembly 200 is characterized by having a closed bottom an open non-submerged upper end an inlet 22 that intersects housing sidewall 20 at a predetermined distance from bottom of tank 10. Liquid transfer housing assembly 200 can be either connected or not connected to a wastewater outlet means 42. Liquid transfer means is positioned within the interior area near bottom end of liquid transfer housing assembly 200. Wastewater 14 is drawn into liquid transfer means 24 and said liquid transfer means is, but not limited to, an airlift pump. Airlift pump 24 discharges wastewater into vertical liquid discharge conduit 26 which then discharges into horizontal liquid discharge conduit 28 that flows into liquid aeration apparatus 100 having a closed bottom end, vertical oriented sidewalls 32 and a liquid outlet section at or near open non-submerged upper end 40.

Wastewater from discharge conduit 28 discharges into intake conduit 30 which discharges at bottom end of aeration apparatus 100 via outlet opening 34. Wastewater is drawn from outlet 34 via an airlift action created by air diffuser 36, upwards into and through biofilm support media 38 positioned, but not limited to, between exterior of intake conduit 30 and interior of liquid aeration apparatus sidewall 32 and exits liquid aeration apparatus 100 via non-submerged upper end 40 and cascades down into surrounding wastewater 14 contained within first chamber of tank 10.

This embodiment is illustrated as having an open upper end, which can serve as a liquid outlet. It will be appreciated by persons skilled in the art that the liquid outlet can take other forms, as has been illustrated in FIG. 6, wherein openings can be made through the sidewalls proximally to the upper end, which can provide direct discharge or a discharge into a liquid conveyance conduit. Air for airlift pump 24 and air diffuser 36 is provided via a forced air means 50 positioned within a dry preferably dust free environment or alternatively can be placed within a proprietary housing or basin 80 equipped with a watertight lid 82 an air intake 84 and a properly fitted electrical supply source 86. Air via forced air means 50 is directed to an air supply conduit 52 that discharges into an air manifold 54 that directs air to air control valves 56 and 58 which are connected to air supply conduits 60 and 62. Air control valve 58 connected to air supply conduit 60 provides a means to adjust the volume of wastewater the airlift pump 24 will discharge over a predetermined amount of time. Air control valve 56 is connected to air supply conduit 62, which delivers air to diffuser 36. Liquid aeration apparatus 100 extent of sidewall 32 submergence depth and the height above wastewater 14 can be adjusted via adjustable support legs 66 position and attached at bottom of liquid aeration apparatus 100 via attachment clips 68. A drain valve 70 that insects near bottom end of sidewall 32 and is equipped with a drain valve control extension handle 72 is incorporated into liquid aeration apparatus 100 to facilitate liquid entering or draining during installation or removal of liquid aeration apparatus 100. The drain valve 70 is opened via extension 72 and once aeration apparatus is full drain valve 70 is closed via extension 72. For draining needs the opposite procedure is followed. Cycling of wastewater, induced via liquid transfer means 24, creates a flow of wastewater from inlet section towards outlet section and allows wastewater to flow across a plurality of vertical oriented biofilm support media 400 placed within the wastewater 14. Biofilm support media 400 are characterized by having a floatation means 46 attached at upper end and a ballast means 48 attached at bottom end of each biofilm support media 400. Biofilm support media 400 can be, but not limited to, made of polymeric material and have various shapes and extensions such as, but not limited to, cuspidal or brittles and each shape can be used singularly or in combination, clustered or independent. To facilitate accessibility to tank 10 access openings are equipped with watertight risers 90 that extend to soil surface and are equipped with watertight lids 92.

Figure 2:
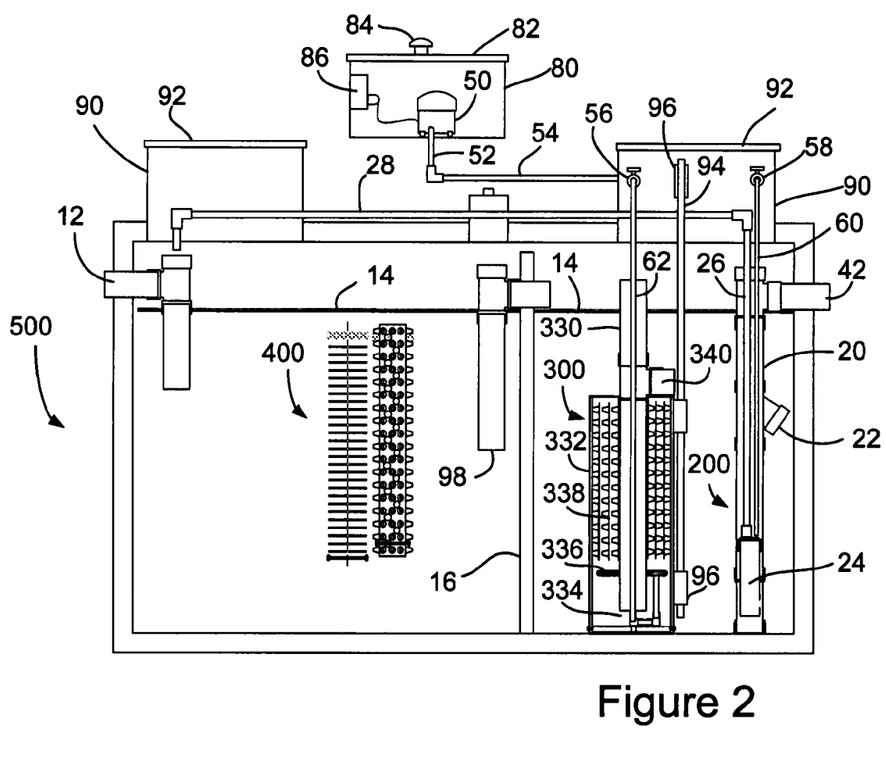
FIG. 2 is a side elevation view, in section of a submerged liquid aeration apparatus and treatment process layout within a two-chamber non-contiguous tank equipped with access risers and lids.
Figure 3:
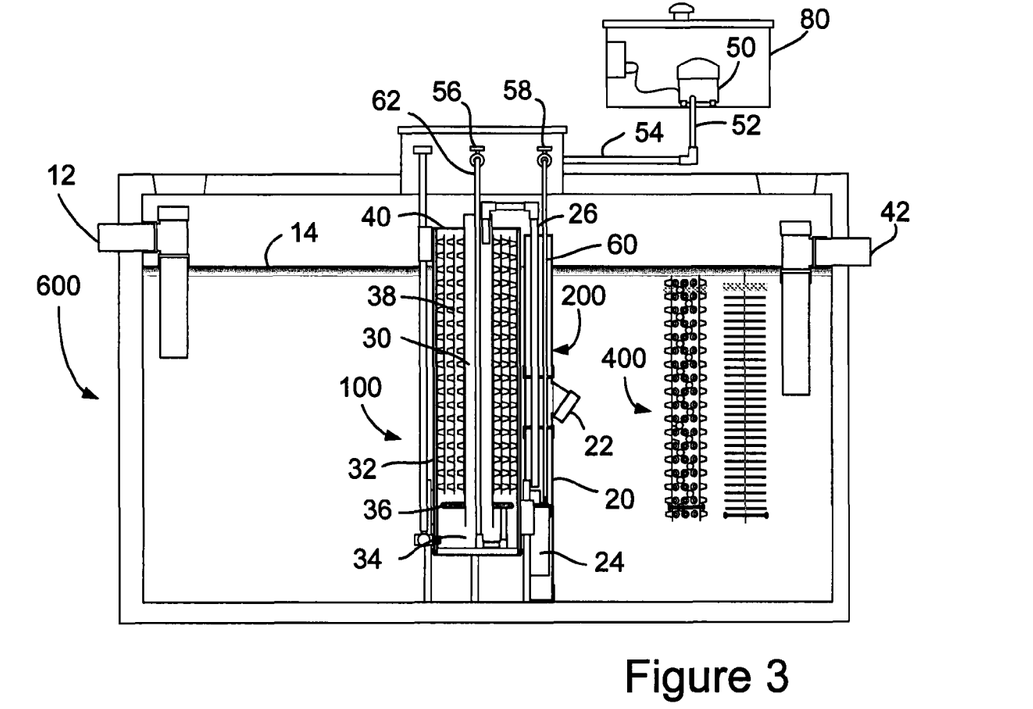
FIG. 3 is a side elevation view, in section of a partially submerged liquid aeration apparatus and treatment process layout within a single chamber tank equipped with access risers and lids.

Alternative embodiments are illustrated within FIGS. 2 and 3 and like components are identified by like number descriptive and wherein FIG. 2 illustrates a two-chamber variant and a fully submerged variant of wastewater aeration apparatus.

Referring now to FIG. 2 tank liquid containment means 500 is divide into two chambers and wherein wastewater 14 is separated from wastewater 14 of second chamber via a divider wall 16 and wastewater 14 is in a non-contiguous communication with wastewater of second chamber. Wastewater flows from first chamber into second chamber via inlet baffle fitting 98. Wastewater 14 within second chamber contains a submerged variant of aeration apparatus 300 and liquid transfer means housing assembly 200 containing an airlift pump 24 as liquid transfer means. Wastewater enters into liquid aeration apparatus via inlet 340 and exits intake conduit 330 at bottom outlet 334. Wastewater is drawn into and up through biofilm support media 338 housed within liquid aeration apparatus 300 via airlift action generated by air diffuser 336 and exits via sub-merged open upper end of liquid aeration apparatus 300 into surrounding wastewater 14. Aeration apparatus is held in a vertical fixed position via support conduit 94 attached to attachment clips 96 located on exterior sidewall 332 at top and bottom of aeration apparatus and upon interior of access riser 90. A portion of aerated wastewater from second chamber is returned to first chamber via airlift pump positioned within liquid transfer housing assembly 200. Wastewater enters inlet section 22 that intersects housing column sidewall 20 positioned at a predetermined distance from tank 10 bottom and is transferred into vertical liquid discharge conduit 26 into horizontal liquid discharge conduit 28 which discharges wastewater into inlet end of first chamber. Air for airlift pump 24 and air diffuser 336 is provided via a forced air means 50 positioned within a dry preferably dust free environment or alternatively can be placed within a proprietary housing or basin 80 equipped a watertight lid 82 an air intake 84 and a properly fitted electrical supply source 86. Air via forced air means 50 is directed to an air supply conduit 52 that discharges into an air manifold 54 that directs air to air control valves 56 and 58 which are connected to air supply conduits 60 and 62. Air control valve 58 connected to air supply conduit 60 provides a means to adjust the volume of wastewater the airlift pump 24 will transfer over a predetermined amount of time. Air control valve 56 is connected to air supply conduit 62, which delivers air to diffuser 336. Airflow to air diffuser controls the rate of throughput that enters into liquid aeration apparatus 300 and additionally the mixing or agitation intensity of the wastewater within chamber two. Return wastewater 14 flow from airlift pump creates a cycling from inlet section towards outlet section of tank 10 and as wastewater cycles it flows across and contacts vertical oriented biofilm media 400.

FIG. 3 illustrates a single chamber layout using another variant of the partially submerged liquid aeration apparatus 100 liquid transfer housing assembly 200 and biofilm support media 400. Raw wastewater enters into tank 600 via inlet 12 and flows into liquid transfer housing assembly 200 via inlet 22 that intersect housing sidewall 20 and is transferred from housing 200 via airlift pump 24 connected to discharge conduit 26 which transfers wastewater into intake conduit 30 of aeration apparatus 100. Wastewater exits intake conduit 30 at bottom outlet section 34 and travels upwards and into biofilm support media 38 contained within interior of sidewall housing 32 and exterior of intake conduit 30 of liquid aeration apparatus 100 via airlift action generated via air diffuser 36 and exits via outlet section at or near non-submerged open upper end 40. Air to air diffuser and airlift pump is provided by a forced air supply means 50 that is placed but not limited to, within a watertight housing or basin 80. Air from forced air supply means directs air to air supply conduit 52 that discharges air into air supply manifold 54 which connects to airflow control valves 56 and 58 that connect to air diffuser air supply conduit 62 and airlift air supply conduit 60. Airflow rate to airlift pump 24 from air control valve 58 determined the volume of wastewater transferred into liquid aeration apparatus 100. The volume of wastewater transferred creates a cycling movement that allows wastewater to flow across biofilm support media 400. All the various embodiments herein previously mentioned can either be used within a gravity discharged system wherein as raw wastewater enters into the containment means an equal amount or treated wastewater is discharged via an outlet 42 or as part of a pressure discharged system wherein a liquid transfer means, not illustrated, is used to discharge wastewater from the liquid containment means. In operations the various embodiments function similarly wherein wastewater flows into aeration apparatus as a controlled volume that is adjusted by but not limited to, the flow of air to either an airlift pump or directly by the air diffuser as in the fully submerged variant of aeration apparatus 300. As wastewater flows through the aeration apparatus 100 or 300 it comes into contact with a large surface area of biofilm support media 38 or 338 contained within liquid aeration apparatus 100 or 300 as well as within the wastewater surrounding and external to liquid aeration apparatus. The media supports large colonies of attached bacteria that provide the foundation of biological conversion or treatment of the wastewater as it cycles about within the liquid containment means. The cycling rate of wastewater 14 is adjusted so that the liquid containment means can still perform the function of settling out solids into three semi distinct layers where heavy solids sink to form a sludge layer and lighter solids rise to form a scum layer. This leaves a middle layer made up of small suspended and colloidal material that are fairly close to the same density as that of liquid. An additional component of the vertical biofilm support media positioned within the wastewater is that it can provide a means of removing some percentage of the suspended solids via entrapment, adsorption and absorption within the biofilm matrix. The wastewater treatment method comprising the use of the liquid transfer housing assembly, the liquid aeration apparatus and the biofilm support media enables an efficient conversion and reduction of organic and some inorganic constituents within the wastewater. The process layout is very adaptive to various site requirements and can be used within an existing liquid containment means as an integrated treatment method as illustrated within FIGS. 1-3 or alternatively can be placed external of a liquid settling containment means.

Another embodiment, from those previously described, comprises the use of at the least one partially submerged floating liquid aeration apparatus and at the least one partially submerged floating liquid transfer housing assembly to be incorporated within a lagoon or pond having a plurality of floating aquatic vegetative islands wherein the roots from the plants are suspended into the lagoon or pond liquid and can thereby act in concert with or act independently as biofilm support media.

Figure 4:
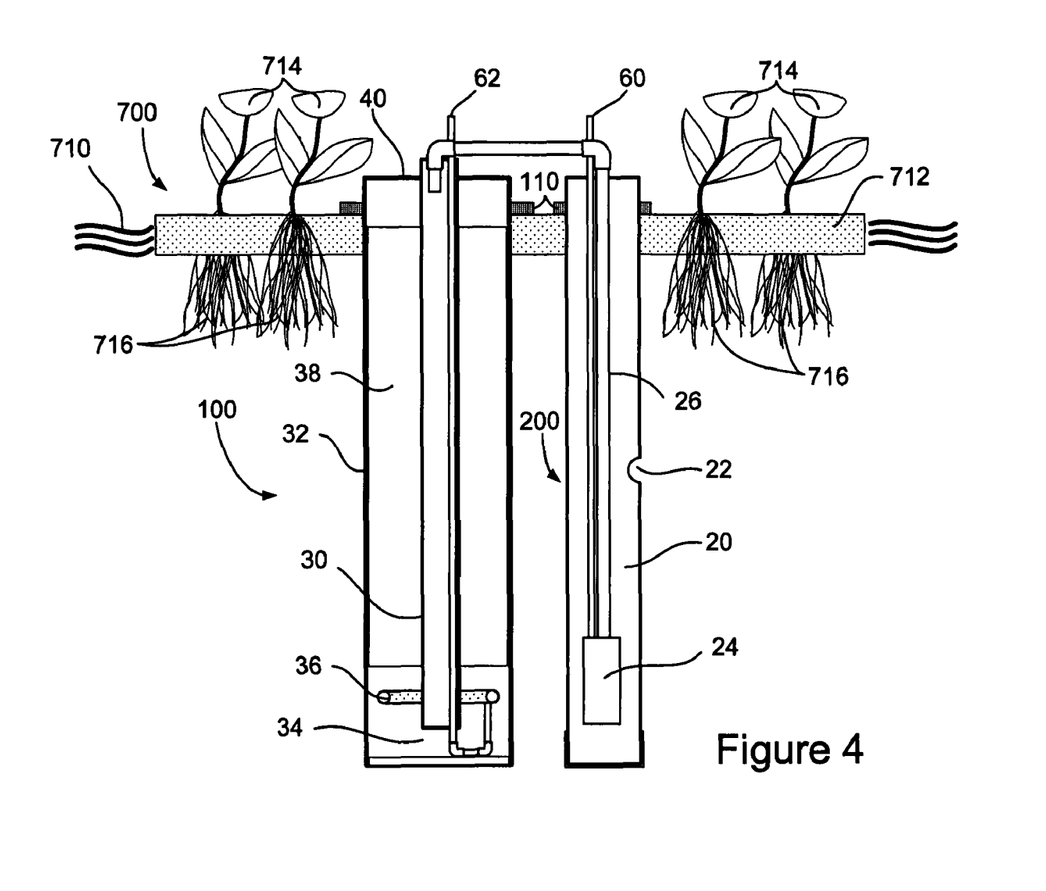
FIG. 4 is a side elevation view, in section of a partially submerged liquid aeration apparatus as part of a floating vegetative island or raft and used within an open body lagoon or pond treatment.

FIG. 4 illustrates an integrated floating aquatic treatment island 700 comprising of but not limited to, root and liquid permeable polystyrene floatation means 712 that support a plurality of aquatic type plants 714 wherein plant roots 716 grow through polystyrene floatation media 712 and are in suspension within liquid 710 below. Liquid aeration apparatus 100 and liquid transfer housing assembly 200 can be incorporated as part of the floating island by attaching externally and proximally to upper end of liquid aeration apparatus housing 32 and to liquid transfer housing 20 a floatation support collar 110 and inserting liquid aeration apparatus 100 and liquid transfer assembly 200 through access holes intersecting polystyrene floatation means. The process of liquid transfer aeration and discharge is performed similarly as is previously described where liquid 710 from lagoon or pond is drawn into inlet 22 intersecting liquid transfer housing 20 and transferred via liquid transfer means such as but not limited to an airlift pump 24. Airlift pump 24 is connected to a liquid discharge conduit 26 that discharges liquid 710 into intake conduit 30 and discharges from intake conduit outlet end 34 where it can flow upwards through biofilm support media 38 contained within and between the interior of aeration housing sidewall 32 and, but not limited to, the exterior of intake conduit 30 via airlift action generated by air diffuser 36. Air supply, within this embodiment, is provided via a forced air supply means which can be located within a watertight basin attached to floatation island or upon land wherein air is directed to air supply conduits 60 and 62. The power consumption efficiency of aeration requirements can allow an alternative power supply from but not limited to solar panels to provide electrical needs to power air supply means.

Aerated liquid 710 exits via outlet section at or near non-submerged upper end 40 and cascades over and through polystyrene media 712 and roots 716 wherein a complex interaction of biological, physical and chemical activities provides for the conversion, uptake evapotranspiration and treatment of liquid 710 contained within a lagoon or pond environment.

This embodiment can be used for improving wastewater quality within the application of existing sewage lagoons or ponds. This variant incorporates, at the least one, floating liquid aeration apparatus, liquid transfer and has, but not limited to at the least one, floating vegetative island or raft wherein roots suspended within the water body of the lagoon or pond provide a means for biofilm support as well as an aesthetic element is provided by the floating aquatic vegetative island. The liquid aeration apparatus and liquid transfer housing containing a liquid transfer pump can be integrated into one of the floating vegetative islands or be designed as stand alone floating components. The treatment method performs similarly to what has been previously mentioned. Cycling of the wastewater allows for flow of wastewater to come into contact with at the least one floating island plant root type biofilm support media or other variants of biofilm support media placed within the lagoon. The lagoon can additionally be divided into a number of segregated zones. The treatment method can also include a subsurface wetland variant that incorporates the floating aquatic vegetative root mass as biofilm support media enabling treatment of the wastewater as it travels laterally across the surface area of the root mass suspended within the wastewater or liquid body.

Figure 5:
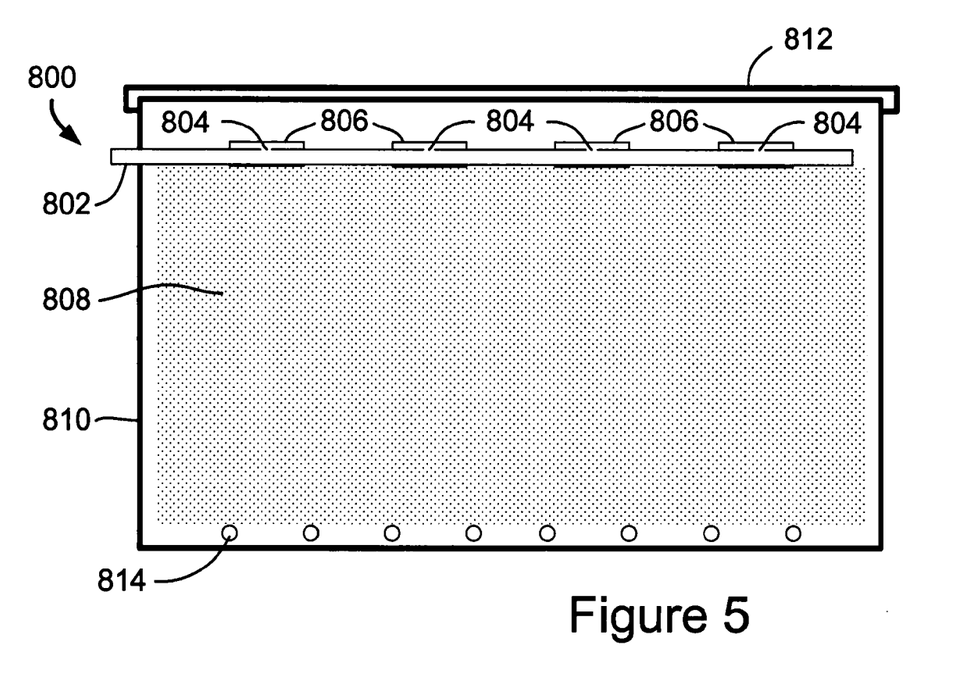
FIG. 5 is a side elevation view, in section of a non-submerged biofilm support media housed within a container having drain holes proximal to bottom section, a liquid distribution system at top section above biofilm support media and a cover.

FIG. 5 illustrates a variant that discharges liquid that has had pretreatment via liquid aeration apparatus, as previously described, into non-submerged biofilm support media 808, comprising of random sized particles of polymeric material, such as but not limited to, expanded polystyrene, held together via an adhesive means in an arrangement that enables the formation of random sized voids of sufficient sizes allowing liquid and gases to permeate through.

Non-submerged media can additionally be comprised of preferably non-woven vertical oriented textile fabric made up of single or as of a blended type of polymeric substances, either as a stand alone material or attached to a polymeric non-biodegradable support means as well as recalcitrant organic type media such as peat, coconut husk fibers, activated carbon and inorganic media such as oyster shells, elemental sulfur or use of media types in combination.

As a function of one embodiment of the non-submerged biofilm support media variant, a controlled volume of pretreated liquid is conveyed to distribution assembly 800 via a controlled dosing system or mechanical pump, not shown, and forces liquid to be discharged out from discharge pipe 802 via orifices 804 that spray into a splash plate 806 which directs liquid to drop down into non-submerged biofilm support media 808 positioned below liquid distribution assembly 800.

Non-submerged biofilm support media 808 is housed within a container 810 comprised of a lid 812 and drain holes 814 spaced a predetermined distance apart along and proximal to bottom section of container 810 thereby allowing liquid to exit.

This non-submerged variant provides the function of a single pass intermittent dosed attached growth filter that can allow for enhanced effluent quality to be discharge into the soil below the container 810 via drain holes 814.

Alternatively the container 810 can be equipped with a directed drainage means that allows liquid to flow into a sump for pump discharge and/or to a flow divider that allows a portion of the flow to drain back to an anoxic liquid that provides denitrification of the nitrified liquid being discharged and also allows the non-submerged variant to function as a recirculating multiple pass attached growth filter.

Figure 6:
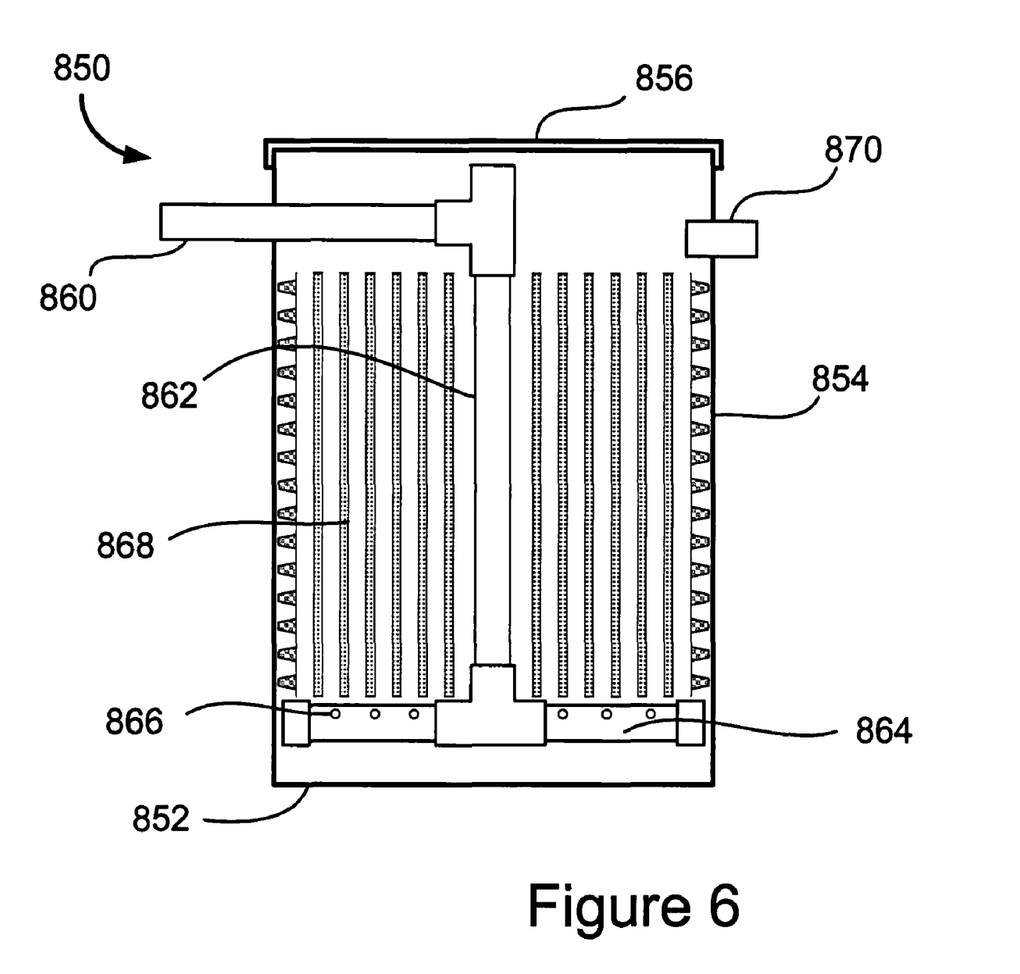
FIG. 6 is a side elevation view, in section of submerged biofilm support media housing that receives liquid and said liquid moves vertically upward through media and discharges from housing above media.

FIG. 6 illustrates an alternative embodiment that discharges liquid into a submerged biofilm support media housing assembly 850 having a closed bottom end 852, sidewalls 854 and a removable lid 856 and which receives pretreated liquid from conveyance pipe 860.

Conveyance pipe 860 is connected to an inlet pipe 862 that is connected to liquid discharge assembly 864 located proximal to closed bottom end 852 of said housing assembly 850

Liquid discharge assembly 864 discharges liquid via discharge orifices 866 positioned a predetermined distance beneath biofilm support media 868

Discharged liquid from discharge orifices 866 flows upward through biofilm support media 868 and exits housing assembly 850 via liquid discharge outlet 870

The liquid discharged from outlet 870 can be directed into a number of options, not illustrated, such as but not limited to, a distribution unit wherein a portion of liquid is returned to an anoxic environment, a containment vessel equipped with a discharge pump or directly into non-submerged media for ultimate or final discharge within the subsurface soil matrix.

Figure 7:
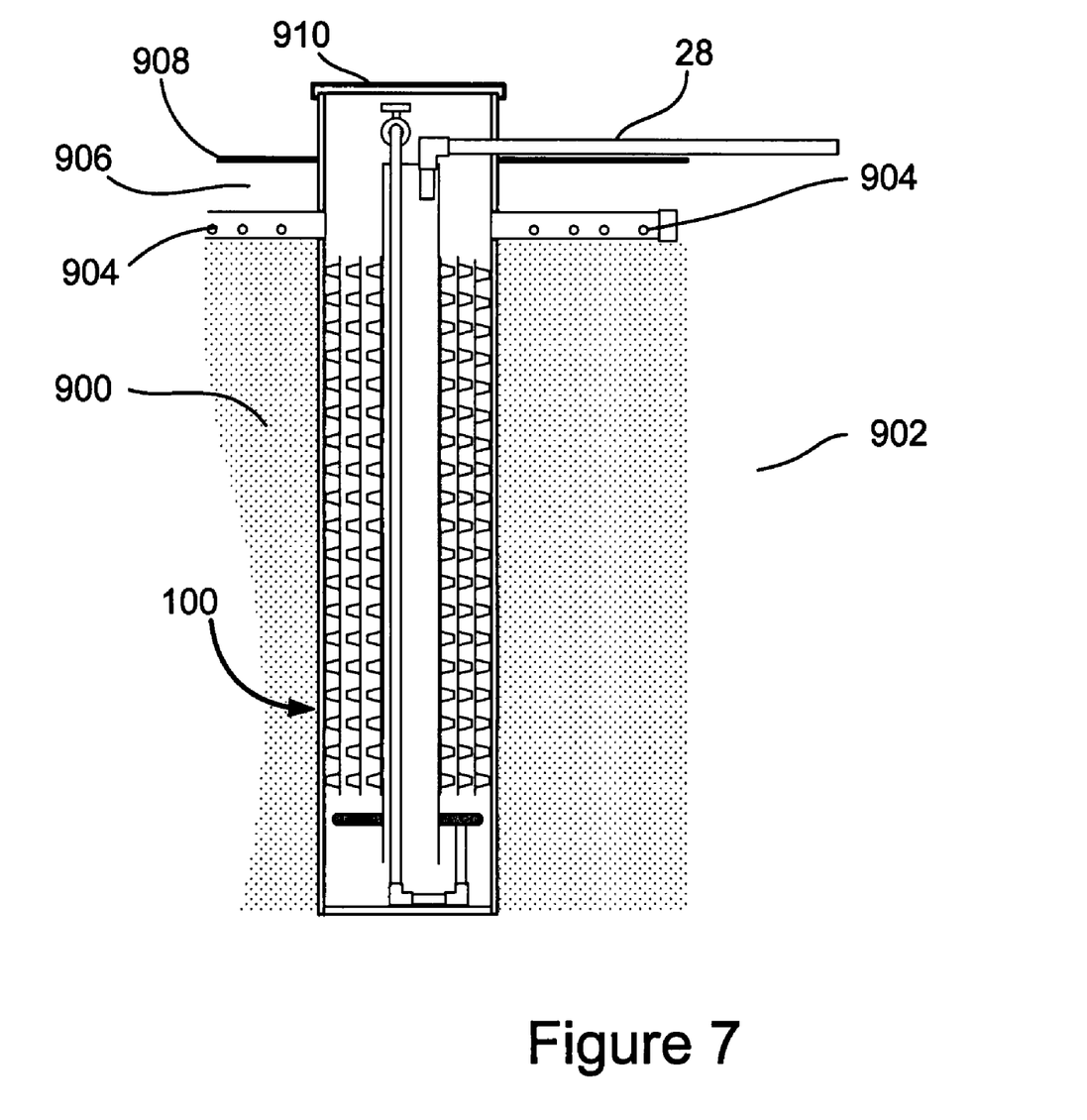
FIG. 7 is a side elevation view, in section of liquid aeration apparatus positioned within a principally non-liquid environment of biofilm support media and/or soil, having liquid perforated discharge conduits extending out from near upper end of liquid aeration apparatus.

FIG. 7, illustrates liquid aeration apparatus 100 having a cover 910 at surface and positioned within non-submerged biofilm support media 900 which is positioned within and surrounded by soil matrix 902.

Liquid enters into liquid aeration apparatus 100 via horizontal liquid discharge conduit 28. Aerated liquid flows upward and discharges out from perforated liquid discharge conduits 904, which extend outward a predetermined distance from upper end sidewalls of said liquid aeration apparatus 100.

Perforated liquid discharge conduits 904 are covered by, but not limited to, a protective layer of aggregate 906 and geotextile fabric 908.

Liquid exits perforations of liquid discharge conduits 904 and flows downward through biofilm support media 900 and into soil matrix 902.

Figure 8A:
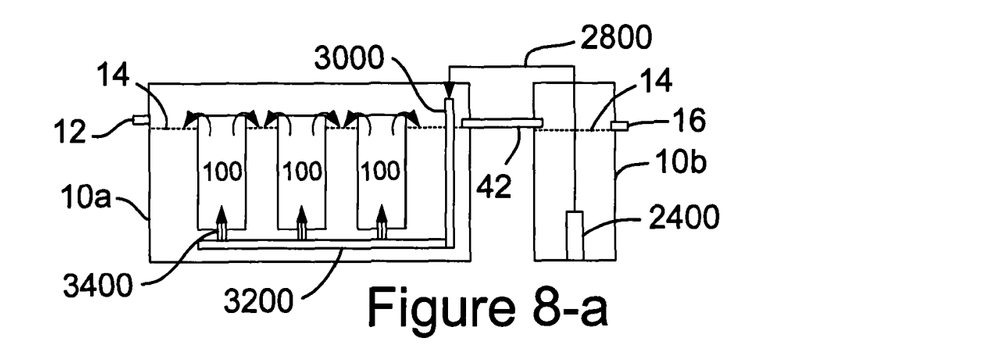

FIG. 8-a illustrates a sectional side view of a plurality of partially submerged liquid aeration apparatuses 100 positioned within wastewater containment 10a.

Wastewater 14 flows into said containment 10a via inlet 12 and discharges into wastewater containment 10b via outlet 42. Liquid can discharge from wastewater containment 10b via outlet 16 or pump (not shown).

Wastewater 14 is transferred via transfer pump 2400 and conveyance conduit 2800 into intake conduit 3000.

Intake conduit 3000 is connected to intake manifold 3200 that connects to outlets 3400 intersecting bottoms of aeration apparatuses 100.

Figure 8B:
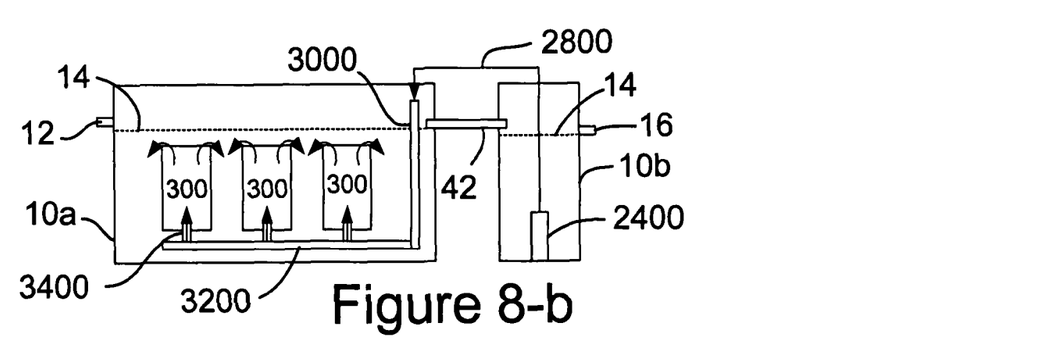

FIG. 8-*b* illustrates a sectional side view that follows a similar liquid flow process of that previously described for FIG. 8-*a*, however this variant illustrates a plurality of submerged liquid aeration apparatuses 300 positioned within wastewater containment 10*a*.

Figure 8C:
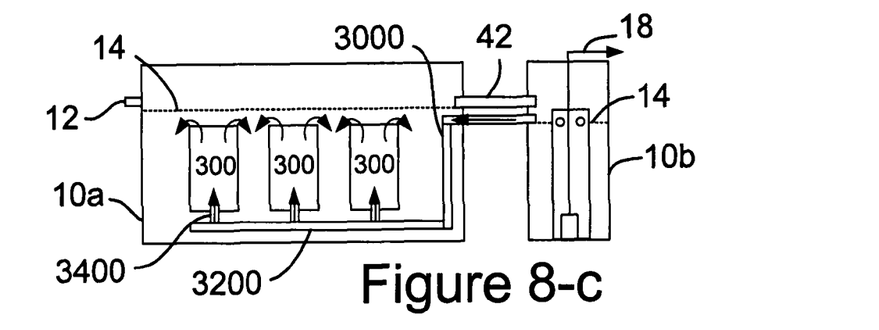

FIG. 8-*c* illustrates a sectional side view of a plurality of submerged liquid aeration apparatuses 300 positioned within wastewater containment 10*a* and wherein wastewater 14 is discharged from wastewater containment 10*b* via gravity into intake conduit 3000 that is connected to intake manifold 3200 that connects to outlets 3400 intersecting bottoms of aeration apparatuses 300.

Wastewater containment 10*b* is equipped with a pump discharge outlet 18.

Denitrification

A common problem associated with aerobic treatment processes, including the prior art for converting septic tanks herein described, is that they convert the nitrogen found in the septic tank effluent, which is commonly in the form of ammonium, to nitrate.

Nitrate is a plant nutrient and when discharged into the subsurface environment and not used up via plant uptake, can travel and mix with the groundwater causing a number of health and environmental problems. For this reason it is becoming a requirement of wastewater treatment technologies to remove a large portion of nitrates or total nitrogen contained within the wastewater effluent prior to being discharged into a subsurface environment or prior to coming into contact with groundwater. Very few aerobic systems employed over the many years have the capability of reducing nitrate or total nitrogen since they are essentially nitrification systems. Nitrification is a biologically mediated process that requires that there is sufficient oxygen added into the aerobic treatment process to convert the ammonium or ammonia nitrogen present in the wastewater into nitrate. The removal of nitrate from the wastewater is called denitrification and similar to the nitrification process is a biologically mediated process requiring an oxygen deprived or anoxic environment with a source of carbon so that the denitrifying heterotrophic and/or autotrophic microorganisms present, can effectively convert the nitrate into preferably dinitrogen gas ($N_2$) which is then vented to the atmosphere and thereby removed from the wastewater. With respect to the current invention it is possible to enhance the nitrification and denitrification process as part of the treatment method with the inclusion of inorganic material such as, but not limited to, iron, sulfur, calcium sulfate, calcium carbonate, oyster shells and preferably used in combination as part of either the submerged or non-submerged biofilm support media environment.

One known prior art that has been developed to address the denitrification of nitrate within an existing septic tank conversion is hereby presented and described with the following U.S. Pat. No. 5,531,894 Jul. 2, 1996 Harold L Ball and Terry R Bounds where they claim a method of improving the quality of septic tank effluent . . . where at least a portion of liquid from the relatively clear horizontal liquid layer between the scum and sludge layers is flowed from a recirculation outlet through an aerobic filter to produce a filter effluent. The filter effluent is flowed to the septic tank. In the anaerobic environment of the septic tank conversion of nitrate nitrogen to gaseous nitrogen products or denitrification occurs.

While this prior art can achieve some denitrification capability it suffers from difficult installation problems and lack of proper flow control to the aerobic filter. The aerobic filter surface area is relatively small and the typical media used, which is randomly packed layered textile chips or pieces, can become biologically clogged after a period of time which will then require removal, cleaning and replacing. Another associated problem is that the installed components make periodic removal of solids accumulated within the septic tank extremely difficult without having to remove one or more components in order to access contents within the septic tank. It is therefore apparent that there is a need for an effective method that can improve effluent quality of, but not limited to, existing conventional septic tank treatment systems and in addition provide for a means of treating liquid containing organic and inorganic constituents as part of an existing and/or new wastewater treatment process that can reduce the pollutant load discharged into, but not limited to, a subsurface receiving environment and in addition reliably meet the required effluent quality standards currently in effect.

Problems associated with conventional septic tank systems and the various conversion technologies herein previously described are addressed with the present invention by providing an adaptable improved aeration apparatus and wastewater treatment method, wherein denitrification can be an intrinsic or inclusive step within the scope of the treatment method. The denitrification process can be performed via the submerged or the partially submerged embodiments. The requirement for performing denitrification using the submerged embodiment requires that a portion of the aerated nitrified liquid be returned to the anoxic liquid of the containment vessel.

The denitrification process pertaining to the partially submerged embodiment is performed by having aerated wastewater discharge from the outlet section near the upper end of the non-submerged liquid aeration apparatus whereby it can be conveyed into a carbon enriched anoxic zone.

The full process begins with an airlift pump or other type of liquid transfer pump positioned within a housing having an inlet section and conveying liquid into the intake end of aeration apparatus. The wastewater enters aeration apparatus near the bottom of intake conduit and is forced upward through, in one embodiment, vertical oriented biofilm support media. Dosing volume to aeration apparatus inlet is controlled, as part of one preferred embodiment, by the amount of airflow delivered to airlift pump. Controlling wastewater dosing flow rate allows wastewater to have a long aeration contact time within aeration apparatus enabling biological conversion of constituents dissolved or as part of the wastewater. Airlift pump provides cycling of wastewater at a sufficient rate to achieve several exchanges of the tank contents over twenty-four hours. The cycling is controlled so that the tank can still perform as a settling container whereby zones of separation are maintained. As wastewater flows out from the outlet section at or near the non-submerged upper end of liquid aeration apparatus it travels across the tank towards airlift pump housing and flows over and through a plurality of vertically oriented biofilm support media where further biological conversion and suspended solid entrapment can occur. The denitrification process can be further enhanced through the introduction of vertical biofilm support media housed within the body of liquid and/or the addition of specific strains of bacteria and more precisely strains from the Bacillus and/or pseudomonas order.

The various treatment method options related to either or both aeration and liquid flow can perform under several operating conditions, such as but not limited to, continuous, intermittent or sequential.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A wastewater treatment method comprising;
   (a) providing a vessel having sidewalls, a closed bottom and an upper end, the sidewalls defining a cross-sectional interior open area with a vertical depth, a liquid outlet being provided at or near the upper end; an air diffuser positioned within the interior open area; and a liquid intake conduit positioned with an inlet end located at or near the upper end of the vessel and an outlet located near the bottom end;
   (b) inserting the vessel into a body of liquid;
   (c) conveying liquid into the inlet end of the liquid intake conduit;
   (d) supplying air to air diffuser; and
   (e) discharging aerated liquid from the liquid outlet at or near the upper end of the vessel.

2. The method according to claim 1, including a step of having the vessel house vertically oriented biofilm support media.

3. The method according to claim 1, including a step of having the vessel house a membrane biofilm type reactor.

4. The method according to claim 1, wherein the step of inserting the vessel into the body of liquid is performed without submerging upper end of the vessel into the body of liquid.

5. The method according to claim 1, wherein the step of inserting the vessel into the body of liquid is performed with a vessel that floats in the body of liquid.

6. The method of claim 1, including a step of adding microorganisms into the body of liquid.

7. The method according to claim 1, wherein the step of supplying air is intermittent.

8. The method according to claim 1, wherein the step of conveying liquid is controlled.

9. A method of wastewater treatment, comprising:
   providing a vessel having sidewalls, a closed bottom and an upper end, the sidewalls defining a cross-sectional interior open area with a vertical depth, a liquid outlet being provided at or near the upper end; an air diffuser positioned within the interior open area of the vessel; and a liquid intake conduit positioned with an inlet end located at or near the upper end of the vessel and an outlet end located near the bottom end;
   conveying liquid into the inlet end of the liquid intake conduit;
   supplying air to air diffuser; and
   discharging aerated liquid from the liquid outlet at or near the upper end of the vessel.

10. The wastewater treatment method of claim 9, wherein the vessel is positioned in a liquid environment.

11. The wastewater treatment method of claim 9, wherein the vessel is positioned in a predominantly non-liquid environment.

* * * * *